(12) United States Patent
Kanai

(10) Patent No.: US 7,779,263 B2
(45) Date of Patent: Aug. 17, 2010

(54) SECURITY SUPPORT APPARATUS AND COMPUTER-READABLE RECORDING MEDIUM RECORDED WITH PROGRAM CODE TO CAUSE A COMPUTER TO SUPPORT SECURITY

(75) Inventor: Yoichi Kanai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1015 days.

(21) Appl. No.: 10/987,425

(22) Filed: Nov. 12, 2004

(65) Prior Publication Data
US 2005/0114677 A1    May 26, 2005

(30) Foreign Application Priority Data
Nov. 14, 2003    (JP) ............... 2003-385463

(51) Int. Cl.
*G06F 21/00*    (2006.01)
(52) U.S. Cl. ............ 713/182; 713/155; 726/27
(58) Field of Classification Search ......... 713/182–185, 713/155; 726/26–30
See application file for complete search history.

(56) References Cited

U.S. PATENT DOCUMENTS

| | | | |
|---|---|---|---|
| 5,870,467 A | 2/1999 | Imai et al. | |
| 6,219,790 B1 * | 4/2001 | Lloyd et al. | 726/14 |
| 6,289,450 B1 | 9/2001 | Pensak et al. | |
| 6,647,388 B2 | 11/2003 | Numao et al. | |
| 6,918,044 B1 * | 7/2005 | Robins et al. | 726/5 |
| 7,143,284 B2 * | 11/2006 | Wheeler et al. | 713/155 |
| 7,194,761 B1 * | 3/2007 | Champagne | 726/6 |
| 7,251,733 B2 * | 7/2007 | Haverinen et al. | 713/182 |
| 7,363,651 B2 * | 4/2008 | de Jong et al. | 726/7 |
| 2001/0002472 A1 | 5/2001 | Kanai | |
| 2002/0029343 A1 | 3/2002 | Kurita | |
| 2004/0125402 A1 | 7/2004 | Kanai | |
| 2004/0128555 A1 | 7/2004 | Saitoh | |
| 2005/0102529 A1 * | 5/2005 | Buddhikot et al. | 713/200 |

FOREIGN PATENT DOCUMENTS

| | | |
|---|---|---|
| JP | H08-137686 | 5/1996 |
| JP | 2000-172646 | 6/2000 |
| JP | 2002-157554 | 5/2002 |
| JP | 2003-022253 | 1/2003 |
| JP | 2003-099266 | 4/2003 |
| JP | 2003-173276 | 6/2003 |

(Continued)

OTHER PUBLICATIONS

European Search Report dated Nov. 15, 2005. 3 pages.

(Continued)

*Primary Examiner*—Kambiz Zand
*Assistant Examiner*—Amare Tabor
(74) *Attorney, Agent, or Firm*—Blakely, Sokoloff, Taylor & Zafman LLP

(57) ABSTRACT

In a computer to support security of information, a user authentication request is received as a request of remote operation call through a network, a user using an external application program is authenticated based on the user authentication request. An authentication result capable of detecting a falsification is generated, and the authentication result is returned as a response of the remote operation call to a request originator through the network.

9 Claims, 16 Drawing Sheets

FOREIGN PATENT DOCUMENTS

JP          2004-229900          8/2004

OTHER PUBLICATIONS

Spence, D., "Data objects and message types in the generic AAA architecture"., IETF Standard, Working Draft. Jan. 2001. XP015035624.

Laat, DE. C., "Generic AAA Architecture". Internet IETF, Aug. 2000. XP-002234363.

Vollbrecht, J., et al "AAA Authorization Framework", Aug. 2000. XP002215731.

Rensing, C. et al "AAA: A Survey and a policy-based architecture and framework". IEEE Network. Nov. 2002. XP001195381.

Ashley, P. "Applying authorization to intranets: architectures, issues and APIs". Nov. 2000. XP0044238464.

Japanese Office Action for JP Appln No. JP 2003-385463, mailed Mar. 5, 2007 (10 pages).

Japanese Office Action for JP2003-385463, Issue date Sep. 25, 2007 (4 Pages).

* cited by examiner

FIG.3

| | |
|---|---|
| L0001 | CREATE AUTHENTICATION TICKET authTicket FOR USER AUTHENTICATION SERVICE PROCESSING PART ITSELF |
| L0002 | CALL startSession() METHOD OF LOG MANAGEMENT SERVICE PROCESSING PART WITH authTicket AS ARGUMENT |
| L0003 | MAINTAIN sysLogSession IN USER AUTHENTICATION SERVICE PROCESSING PART |
| L0004 | END |

FIG.4

```
Ticket {
        String userId;
        String type;
        byte[ ] mac;
};
```
~ 4

FIG.5

| | |
|---|---|
| L0101 | RECEIVE AUTHENTICATION TICKET |
| L0102 | CALCULATE HASH VALUE OF CHARACTER STRING MERGING userId AND type OF AUTHENTICATION TICKET IN ACCORDANCE WITH SHA-1 ALGORITHM |
| L0103 | ENCRYPT HASH VALUE IN ACCORDANCE WITH DES ALGORITHM BY USING SECRET KEY OF USER AUTHENTICATION SERVICE PROCESSING PART |
| L0104 | COMPARE ENCRYPTED VALUE WITH mac OF AUTHENTICATION TICKET |
| L0105 | If (NOT MATCH) { |
| L0106 | RETURN ERROR AND TERMINATE |
| L0107 | } |
| L0108 | RETURN DETERMINATION RESULT SHOWING THAT AUTHENTICATION TICKET IS VALID |
| L0109 | END |

FIG.6

| | |
|---|---|
| L0401 | CALL authenticate() METHOD OF USER AUTHENTICATION SERVICE PROCESSING PART WITH USER ID AND PASSWORD BEING POSSESSED BY APPLICATION PROGRAM ITSELF AS ARGUMENTS |
| L0402 | if (AUTHENTICATION FAILURE) { |
| L0403 | RETURN ERROR AND TERMINATE |
| L0404 | } |
| L0405 | RECEIVE AUTHENTICATION TICKET appTicket AS RESULT OF authenticate() |
| L0406 | CALL startSession() METHOD OF ACCESS CONTROL DECISION SERVICE PROCESSING PART WITH AUTHENTICATION TICKET appTicket AS ARGUMENT, RECEIVE appAccSession SHOWING SESSION ID |
| L0407 | MAINTAIN appAccSession IN APPLICATION PROGRAM |
| L0408 | CALL startSession() METHOD OF LOG MANAGEMENT SERVICE PROCESSING PART WITH AUTHENTICATION TICKET appTicket AS ARGUMENT, AND RECEIVE appLogSession SHOWING SESSION ID |
| L0409 | MAINTAIN appLogSession IN APPLICATION PROGRAM |
| L0410 | END |

FIG.7

| | |
|---|---|
| L0301 | RECEIVE AUTHENTICATION TICKET |
| L0302 | CHECK WHETHER OR NOT type OF AUTHENTICATION TICKET IS "SYSTEM" |
| L0303 | if (NOT "SYSTEM") { |
| L0304 | RETURN ERROR AND TERMINATE (REGULAR USER CAN NOT RECORD LOG) |
| L0305 | } |
| L0306 | CALL checkTicket() METHOD OF USER AUTHENTICATION SERVICE PROCESSING PART WITH AUTHENTICATION TICKET AS ARGUMENT, AND CHECK WHETHER OR NOT AUTHENTICATION TICKET IS VALID |
| L0307 | if (INVALID) { |
| L0308 | RETURN ERROR AND TERMINATE |
| L0309 | } |
| L0310 | GENERATE SESSION ID AND RECORD SESSION ID TO SESSION MANAGEMENT TABLE |
| L0311 | RETURN SESSION ID AND TERMINATE |

FIG.8

6 ACCOUNT MANAGEMENT TABLE

| userId | password | type |
|---|---|---|
| appSystemA | pwdAppSystem01 | SYSTEM |
| appSystemB | pwdAppSystem02 | SYSTEM |
| appSystemC | pwdAppSystem03 | SYSTEM |
| userName01 | pwdUserName01 | USER |
| userName02 | pwdUserName02 | USER |
| ... | ... | ... |

FIG.9

| | |
|---|---|
| L0121 | RECEIVE USER ID AND PASSWORD |
| L0122 | SEARCH FOR ENTRY CORRESPONDING TO USER ID FROM ACCOUNT MANAGEMENT TABLE |
| L0123 | if (NO ENTRY) { |
| L0124 | CALL writeLog() METHOD OF LOG MANAGEMENT SERVICE PROCESSING PART WITH sysLogSession AND LOG DATA SHOWING AUTHENTICATION FAILURE AS ARGUMENTS |
| L0125 | RETURN ERROR AND TERMINATE |
| L0126 | } |
| L0127 | CHECK WHETHER OR NOT RECEIVED PASSWORD MATCHES PASSWORD OF ENTRY |
| L0128 | if (NOT MATCH) { |
| L0129 | CALL writeLog() METHOD OF LOG MANAGEMENT SERVICE PROCESSING PART WITH sysLogSession AND LOG DATA SHOWING AUTHENTICATION FAILURE AS ARGUMENTS |
| L0130 | RETURN ERROR AND TERMINATE |
| L0131 | } |
| L0132 | CREATE AUTHENTICATION TICKET INCLUDING ENTRY INFORMATION (userId, type) |
| L0133 | CALL writeLog() METHOD OF LOG MANAGEMENT SERVICE PROCESSING PART WITH sysLogSession AND LOG DATA SHOWING SUCCESSFUL AUTHENTICATION AS ARGUMENTS |
| L0134 | SEND AUTHENTICATION TICKET AND TERMINATE |

FIG.10

| | |
|---|---|
| L0321 | RECEIVE SESSION ID AND LOG DATA |
| L0322 | CHECK WHETHER OR NOT SESSION ID IS RECORDED IN SESSION MANAGEMENT TABLE |
| L0323 | if (NOT RECORDED) { |
| L0324 | RETURN ERROR AND TERMINATE |
| L0325 | } |
| L0326 | RECORD LOG DATA IN LOG MANAGEMENT SERVICE PROCESSING PART |
| L0327 | END |

FIG.11

| | |
|---|---|
| L0421 | RECEIVE USER ID AND PASSWORD FROM USER |
| L0422 | CALL authenticate() METHOD OF USER AUTHENTICATION SERVICE PROCESSING PART WITH USER ID AND PASSWORD AS ARGUMENT |
| L0423 | if (AUTHENTICATION FAILURE) { |
| L0424 | SEND AUTHENTICATION FAILURE TO USER AND TERMINATE |
| L0425 | } |
| L0426 | GENERATE SESSION ID, AND RECORD SESSION ID TO SESSION MANAGEMENT TABLE WITHIN APPLICATION PROGRAM BY ASSOCIATING WITH AUTHENTICATION TICKET RETURNED BY authenticate() METHOD |
| L0427 | RETURN SESSION ID AND TERMINATE |

FIG.12

| | |
|---|---|
| L0431 | RECEIVE SESSION ID, OBJECT ID OF ACCESS SUBJECT, AND ACCESS TYPE FROM USER |
| L0432 | RETRIEVE AUTHENTICATION TICKET ASSOCIATED WITH SESSION ID FROM SESSION MANAGEMENT TABLE |
| L0433 | if (NO SESSION ID) { |
| L0434 |     SEND ERROR TO USER AND TERMINATE |
| L0435 | } |
| L0436 | CALL isAllowed() METHOD OF ACCESS CONTROL DECISION SERVICE PROCESSING PART WITH appAccSession PROCESSED IN APPLICATION PROGRAM, userId INCLUDED IN AUTHENTICATION TICKET, OBJECT ID RECEIVED FROM USER, AND ACCESS TYPE AS ARGUMENTS |
| L0437 | if (ERROR) { |
| L0438 |     SEND ERROR TO USER AND TERMINATE |
| L0439 | } |
| L0440 | if (DECISION RESULT SHOWS "ACCESS NOT ALLOWED") { |
| L0441 |     SEND INFORMATION SHOWING THAT ACCESS IS NOT ALLOWED, AND TERMINATE |
| L0442 | } |
| L0443 | PROCESS ACCESS REQUESTED FROM USER |
| L0444 | CALL writeLog() METHOD OF LOG MANAGEMENT SERVICE PROCESSING PART WITH appLogSession PROCESSED IN APPLICATION PROGRAM AND LOG OF ACCESS PROCESS AS ARGUMENTS |
| L0445 | RETURN PROCESS RESULT TO USER |
| L0446 | END |

FIG.13

```
AccTable {
         AccEntry[ ] accEntries;            } 5a
};
AccEntry {
         String  objectId;
         Acl     acl;                        } 5b
};
Acl {
         AccElement[ ] accElements;          } 5c
};
AccElement {
         String  userId;
         Boolean read;
         Boolean write;                      } 5d
         Boolean execute;
};
```

| | |
|---|---|
| L0201 | RECEIVE SESSION ID, USER ID, OBJECT ID, AND SUCCESS TYPE |
| L0202 | CHECK WHETHER OR NOT SESSION ID IS RECORDED IN SESSION MANAGEMENT TABLE |
| L0203 | if (NOT RECORDED) { |
| L0204 | RETURN ERROR AND TERMINATE |
| L0205 | } |
| L0206 | SEARCH FOR ENTRY CORRESPONDING TO OBJECT ID FROM ACCESS CONTROL TABLE |
| L0207 | if (NO ENTRY) { |
| L0208 | RETURN ERROR AND TERMINATE |
| L0209 | } |
| L0210 | CHECK BY REFERING TO ENTRYS WHETHER OR NOT ACCESS TYPE IS ALLOWED WITH RESPECT TO USER ID |
| L0211 | if (NOT ALLOWED) { |
| L0212 | RETURN DECISION RESULT SHOWING THAT ACCESS TYPE IS NOT ALLOWED |
| L0213 | END |
| L0214 | } |
| L0215 | RETURN DECISION RESULT SHOWING THAT USER IS ALLOWED FOR ACCESS TYPE |
| L0216 | END |

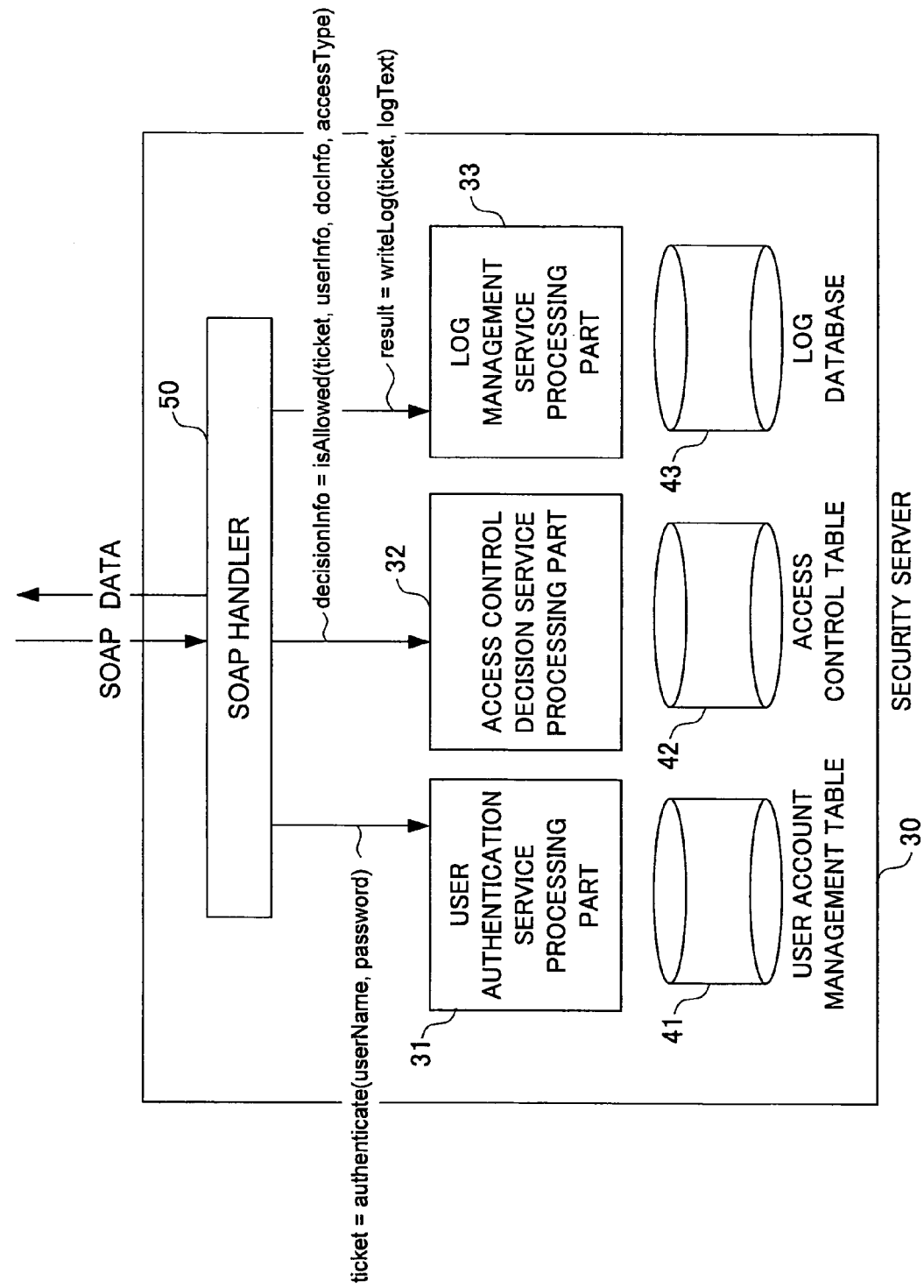

SECURITY SUPPORT APPARATUS AND COMPUTER-READABLE RECORDING MEDIUM RECORDED WITH PROGRAM CODE TO CAUSE A COMPUTER TO SUPPORT SECURITY

The present application claims priority to the corresponding Japanese Patent Application No. 2003-385463, filed on Nov. 14, 2003, the entire contents of which are hereby incorporated by reference.

BACKGROUND OF THE INVENTION

1. Field of the Invention

The present invention generally relates to security support apparatuses and computer-readable recording media recorded with program code, and more particularly to a security support apparatus and a computer-readable recording medium recorded with program code to cause a computer to support security of information, in which a uniformed security function for a plurality of application programs can be provided.

2. Description of the Related Art

Simple Object Access Protocol (SOAP) has been developed as a protocol to call data or a service residing in other computers. Recently, an infrastructure technology is being put into place to communicate in accordance with a protocol for a distributed object access written in an XML (extensible Markup Language) on an HTTP (HyperText Transfer Protocol).

One service accessible by SOAP through a network is called a Web service. Regarding the Web service, a security policy as a Web Services Security (WS-Security) has come under review. Basically, this Web service security, which has been considered, is to conduct a SOAP message exchange being secured to the Web service.

The Web service is a service program that is assumed to be used through the Internet (Intranet) from various application programs. Each application program generally conducts a user authentication, an access control, and a log record to secure information. On the standard scale, these three functions are required.

In order to realize a secured Web service, Japanese Laid-Open Patent Application No. 2003-22243 discloses that an access authority of a client is based on a token and is given to the client and a server conducts the access control by verifying a validity of the token provided from the client.

In a conventional technology, it is useful to reduce management cost in the server. However, in order to secure server applications, it is necessary to implement this mechanism with the conventional technology in each server application.

With a view toward securing the entire system, since the above-described three functions are critical security functions for each application program, it is desirable to provide the security function as a Web service that can be shared for use in maintaining consistent security. However, in the conventional technology, since it is impossible to share the mechanism with other server applications, then consistently supplying the security function for each of the plurality of application programs cannot be achieved.

SUMMARY OF THE INVENTION

A security support apparatus and article of manufacture to support security are disclosed. In one embodiment, the article of manufacture includes a recordable media storing instructions which, when executed by a system, cause the system to perform a method comprising receiving a user authentication request as a request of remote operation call through a network, authenticating a user using an external application program based on the user authentication request, generating an authentication result capable of detecting a falsification, and returning the authentication result as a response of the remote operation call to a request originator through the network. The information is secured for the external application program through the network.

BRIEF DESCRIPTION OF THE DRAWINGS

Other objects and further features of the present invention will be apparent from the following detailed description when read in conjunction with the accompanying drawings, in which:

FIG. 3 is a diagram for illustrating an initial process conducted by a user authentication service processing unit in step S11 in FIG. 2 in detail, according to the embodiment of the present invention;

FIG. 4 is a diagram showing a data structure of an authentication ticket according to the embodiment of the present invention;

FIG. 5 is a diagram for illustrating an authentication determining process conducted by the user authentication service processing unit in step S12 in FIG. 2 in detail according to the embodiment of the present invention;

FIG. 6 is a diagram for illustrating the initial process in an application program in steps S13, S15, and S17 in FIG. 2 in detail, according to the embodiment of the present invention;

FIG. 7 is a diagram for illustrating a session start process conducted by a log management service processing unit or an access control decision service processing unit in steps S12, S16, and S18 in FIG. 2, according to the embodiment of the present invention;

FIG. 8 is a diagram showing an example of an account management table used by the user authentication service processing unit according to the embodiment of the present invention;

FIG. 9 is a diagram illustrating a user authentication process conducted by the user authentication service processing unit in steps S13 and S20 in FIG. 2 in detail according to the embodiment of the present invention;

FIG. 10 is a diagram for illustrating a log record process conducted in the log management service processing unit in steps S14, S21, and S24 in FIG. 2, according to the embodiment of the present invention;

FIG. 11 is a diagram for illustrating a login process conducted by the application program in step S119 in FIG. 2, according to the embodiment of the present invention;

FIG. 12 is a diagram for illustrating an access process conducted by the application program in step S22 in FIG. 2, according to the embodiment of the present invention;

FIG. 13 is a diagram showing a data structure of the access control table possessed in the access control decision service processing unit according to the embodiment of the present invention;

FIG. 15 is a diagram for illustrating an access allowing process conducted by the access control decision service processing unit in step S23 in FIG. 2, according to the embodiment of the present invention; and FIG. 16 is a block diagram showing a functional configuration to provide a Web service through SOAP, according to the embodiment of the present invention.

DESCRIPTION OF THE PREFERRED EMBODIMENT

Figure 1:
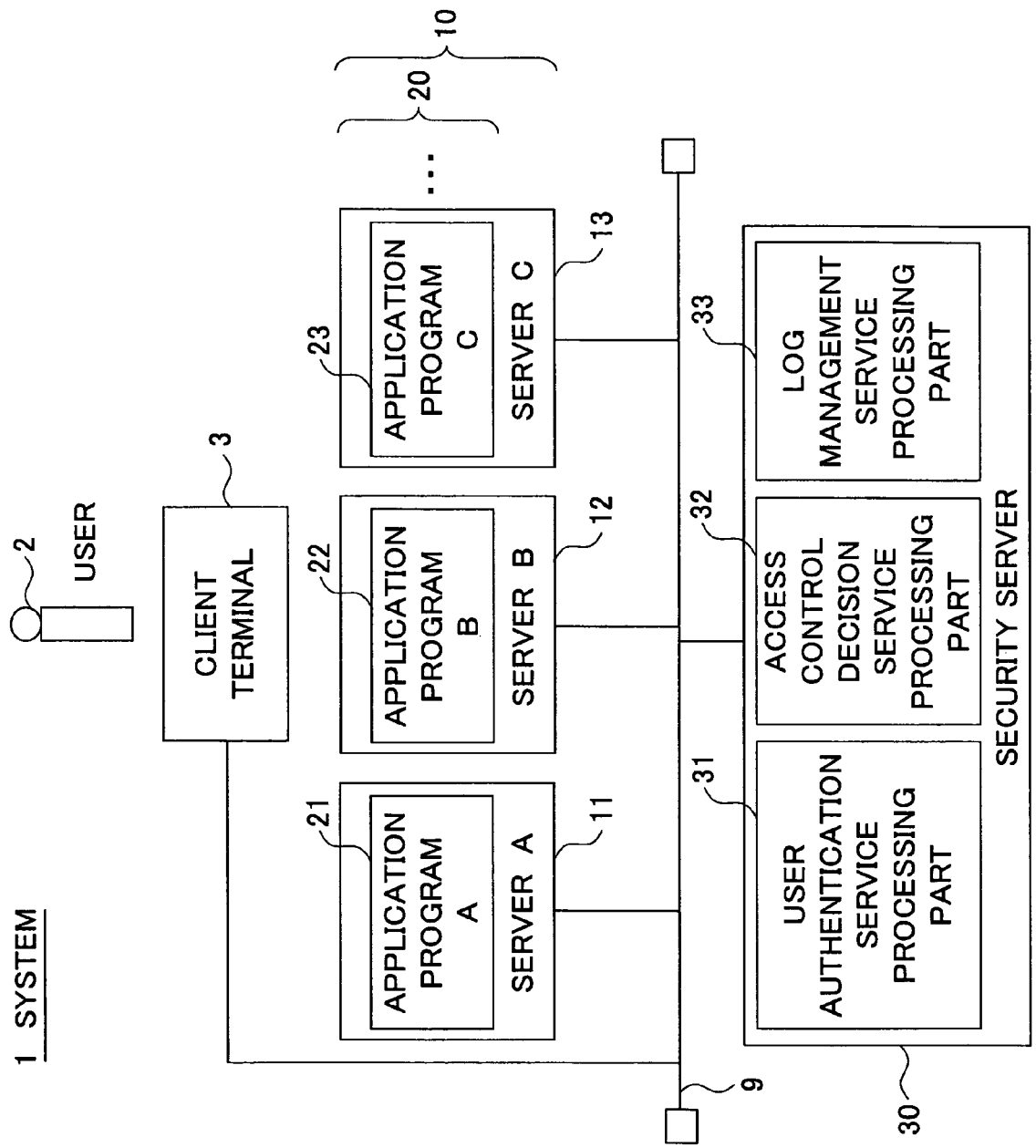
FIG. 1 is a block diagram showing a configuration of a system according to the embodiment of the present invention.

Embodiments of the present invention include security support apparatuses and computer-readable recording media recorded with program code to cause a computer to support security of information in which the above-mentioned problems are eliminated.

A more specific embodiment of the present invention is a security support apparatus and a computer-readable recording medium recorded with program code to cause a computer to support security of information, in which security functions of a plurality of application programs can be uniformed and supplied.

Some embodiments of the present invention are achieved with a computer-readable recording medium recorded with program code to cause a computer to support security of information, the program code including: receiving a user authentication request as a request of remote operation call through a network; authenticating a user using an external application program based on the user authentication request; generating an authentication result capable of detecting a falsification; and returning the authentication result as a response of the remote operation call to a request originator through the network, whereby information is secured for the external application program through the network.

According to one embodiment of the present invention, it is possible to realize a consistent security with respect to the external application program.

Some embodiments of the present invention are achieved with a computer-readable recording medium recorded with program code to cause a computer to support security of information, the program code including: receiving an access control decision request as a request of a remote operation call through a network; deciding based on the access control decision request to allow or not to access an external application program; and returning a decision result in the deciding based on the access control decision request as a response of the remote operation call, to a request originator through the network, whereby information is secured for the external application program through the network.

According to one embodiment of the present invention, it is possible to realize a consistent security with respect to the external application program.

Some embodiments of the present invention are achieved with a computer-readable recording medium recorded with program code to cause a computer to support security of information, the program code including: receiving an access control decision request as a request of a remote operation call through a network; determining whether or not a request originator of the access control decision request is a valid system; deciding based on the access control decision request to allow or not to access when the request originator is the valid system; and returning a decision result in the deciding based on the access control decision request as a response of the remote operation call to the request originator through the network, whereby information is secured for the external application program through the network.

Moreover, some embodiments of the present invention are achieved by a computer-readable recording medium recorded with program code to cause a computer to support security of information, the program code including: receiving an access control decision request as a request of a remote operation call through a network; deciding based on the access control decision request to allow or not to access with respect to the external application program; returning a decision result in the deciding based on the access control decision request as a response of the remote operation call through the network; and recording contents of the access control decision request, the decision result, and a log, whereby information is secured for the external application program through the network.

According to one embodiment of the present invention, it is possible to eliminate a problem that makes it difficult to secure information when an invalid user records a large amount of logs. Accordingly, it is possible to realize a consistent security with respect to the external application program.

Embodiments of the present invention can be achieved with a program code for causing a computer to conduct processes described above.

In the following, an embodiment of the present invention will be described with reference to the accompanying drawings.

FIG. 1 is a block diagram showing a configuration of a system according to the embodiment of the present invention. In FIG. 1, a system 1 includes a client terminal 3 used by a user 2, a plurality of servers 10, and a security server 30, which are mutually connected to each other through a network 9. A plurality of client terminals 3 may be connected to the network 9. As the plurality of servers 10, for example, a server A 11, a server B 12, a server C 13, . . . are connected to the network 9. The server A 11 includes an application program A 21, the server B 12 includes an application program B 22, and the server C 13 includes an application program C 23. Hereinafter, the application program A 21, the application program B 22, and the application program C 23 are collectively called an application program 20.

The security server 30 includes a user authentication service processing unit 31 for authenticating the user 2, an access control decision service processing unit 32 for deciding an access control, and a log management service processing unit 33 for managing logs.

In the system 1 including the configuration described above, for example, a communication control is conducted in accordance with a SOAP (Simple Object Access Protocol), and each of the user authentication service processing unit 31, the access control decision service processing unit 32, and the log management service processing unit 33 are executed to provide Web services, respectively.

Each of the application programs 20 sends a user authentication request for authenticating the user 2, an access control decision request for deciding access control with respect to the application programs 20 for the user 2, or a log record request for recording a log, to the security server 30. Then, the security server 30 returns a process result after processing the request received from each of the application programs 20. Each of the application programs 20 controls access of a resource that is required to be secure, based on the process result, and simultaneously secure the resource so as to audit later.

The access control is executed similarly even in a case in the user 2 at each of the servers 10 directly accesses the application programs 20 and even in a in that the user 2 accesses the client terminal 3 through the network 9.

Next, a process sequence conducted by the user 2, each of the application programs 20, and the security server 30 in the system 1 will be described with reference to FIG. 2.

Figure 2:
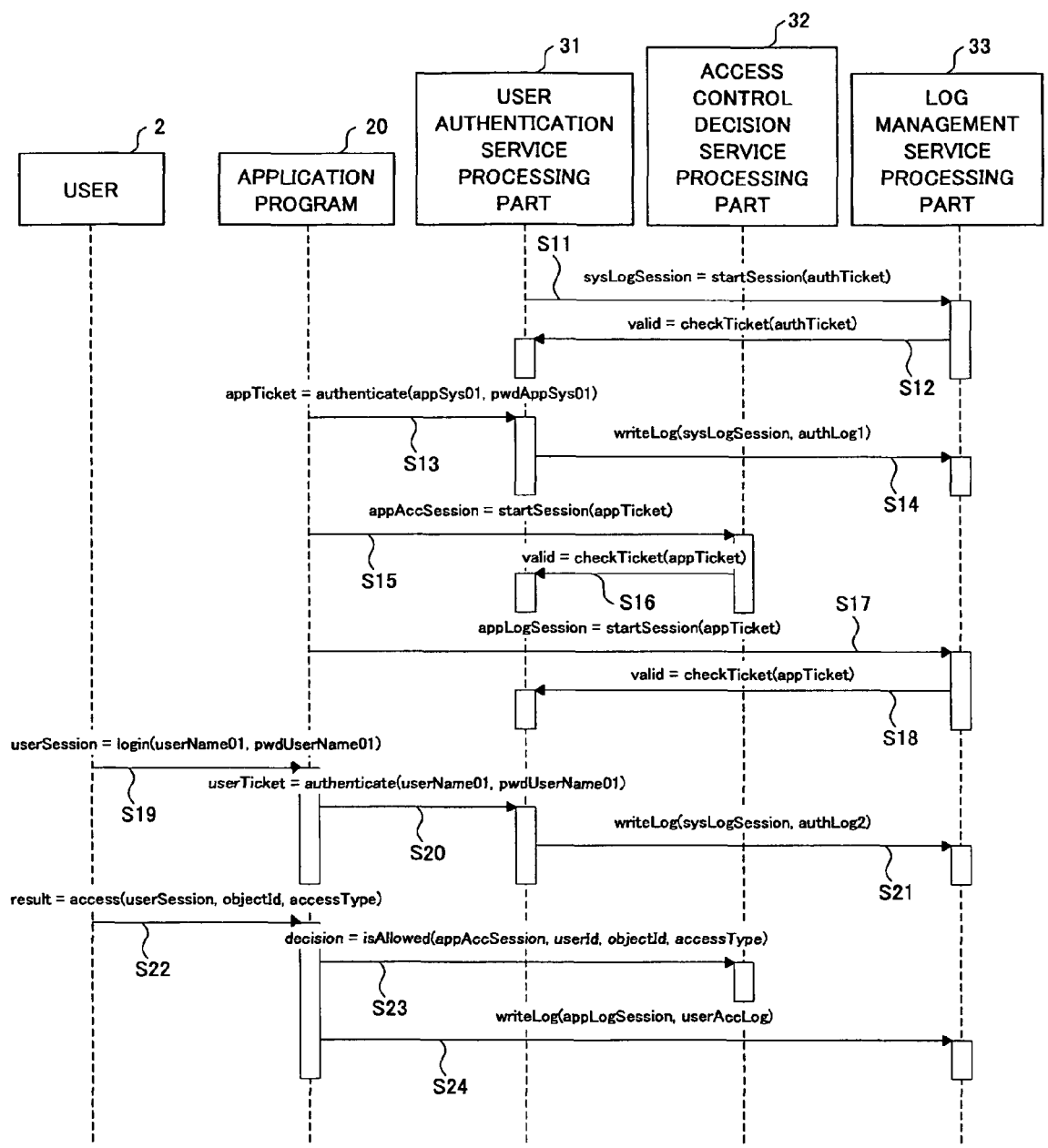
FIG. 2 is a diagram for illustrating the process sequence conducted in the system according to the embodiment of the present invention.

FIG. 2 is a diagram for illustrating the process sequence conducted in the system according to an embodiment of the present invention. In FIG. 2, the user 2 is shown with two cases, one case in which the user 2 uses the client terminal 3 and a second case in which the user 2 directly operates one of the application programs 20.

In FIG. 2, the user authentication service processing unit 31 of the security server 30 creates an authentication ticket "authTicket" for itself, and conducts an initial process for establishing a session with the log management service processing unit 33 by calling "sysLogSession=startSession(authTicket)" (step S11). The user authentication service processing unit 31 obtains a session ID "sysLogSession" from the log management service processing unit 33.

The log management service processing unit 33 of the security server 30 calls "valid=checkTicket(authTicket)" with respect to the user authentication service processing unit 31, and inquires the user authentication service processing unit 31 whether or not the authentication ticket "authTicket" received from the user authentication service processing unit 31 is valid (step S12). The user authentication service processing unit 31 determines validity of the authentication ticket, and returns a decision result "valid" to the log management service processing unit 33.

The application program 20 calls "appTicket=authenticate(appSys01,pwdAppSys01( )" through the network 9, and requires issuance of a ticket to the user authentication service processing unit 31 (step S13). The application program 20 obtains a ticket "appTicket" from the user authentication service processing unit 31. The user authentication service processing unit 31 requires a log record concerning this authentication to be made to the log management service processing unit 33 by calling "writeLog(sysLogSession,authLog1)" (step S14). The log management service processing unit 33 creates the log record concerning the authentication.

The application program 20 establishes a session with the access control decision service processing unit 32 by calling "appAccSession=startSession(appTicket)" using the ticket "appTicket" from the user authentication service processing unit 31 (step S16). The access control decision service processing unit 32 calls "valid=checkTicket(appTicket)" using the ticket "appTicket" informed from the application program 20, with respect to the user authentication service processing unit 31, and executes a user authentication of the application program 20 (step S15). Only when the user authentication is successful for the application program 20, the access control decision service processing unit 32 returns a session ID with respect to the application program 20.

The application program 20 calls "appLogSession=startSession(appTicket)" using the ticket "appTicket" with respect to the log management service processing unit 33 (step S17). The log management service processing unit 33 requires the user authentication service processing unit 31 to perform the user authentication by the ticket "appTicket" informed from the application program 20, by calling "valid=checkTicket(appTicket)" (step S18). When the user authentication is successful, the log management service processing unit 33 returns a session ID "appLogSession" to the application program 20.

A login by the user 2 to the application program 20 is performed by calling "userSession=login(userName01,pwdUserName01)", and obtains a session "userSession" for the user 2 from the application program 20 (step S19). The application program 20 requires the user authentication service processing unit 31 to authenticate the user 2 by calling "userTicket=authenticate(userName01,pwdUserName01)" using a user name and a password (step S20). The user authentication service processing unit 31 returns the ticket for the user 2 to the application program 20 when the user 2 is successfully authenticated. In step S19, the application program 20 returns the session "userSession" for the user 2 only when the ticket is obtained from the user authentication service processing unit 31. In addition, the user authentication service processing unit 31 requires the log management service processing unit 33 to make the log record concerning the user authentication of the user 2 by calling "writeLog(sysLogSession,authLog2)" (step S21).

An access by the user 2 to the application program 20 is performed by calling "result=access(userSession,objectId,accessType)", and a process result is obtained from the application program 20 (step S22). The application program 20 performs an access control decision request by calling "decision=isAllowed(appAccSession,userId,objectId,accessType)" with respect to the access control decision service processing unit 32, and obtains a decision result (step S23). The application program 20 returns a process result as "result" in step S22 after executing a process based on the decision result. The application program 20 records a log of the session of the user 2 and the access control by calling "writeLog(applogSession,userAccLog)" with respect to the log management service processing unit 33 (step S24).

As described above, after the user authentication service processing unit 31 authenticates the application program 20 and the user 2, it is possible to decide the access control and conduct the log record. Therefore, it is possible to prevent an invalid access and an invalid log record.

FIG. 3 is a diagram for illustrating the initial process conducted by the user authentication service processing unit in step S11 in FIG. 2 in detail, according to the embodiment of the present invention. In FIG. 3, the user authentication service processing unit 31 creates an authentication ticket authTicket for itself (L0001). Moreover, the user authentication service processing unit 31 calls startSession( ) method of the log management service processing unit 33 with authTicket as an argument, and obtains "sysLogSession" showing a session ID as a returned value (L0002). Then, the user authentication service processing unit 31 maintains the "sysLogSession" within the user authentication service processing unit 31 (L0003), and terminates the initial process (L0004).

FIG. 4 is a diagram showing a data structure of the authentication ticket according to the embodiment of the present invention. In FIG. 4, a data structure 4 of the authentication is shown by code showing "Ticket {String userId; String type; byte[ ] mac;}", and includes "userId" showing a user ID for identifying the user authentication service processing unit 31 by a character string, "type" showing a type by a character string, and "mac" showing a mac (message authentication code) of the user authentication service processing unit 31 by an array byte [ ].

The "userId" stores the character string showing the user ID of a user who is successfully authenticated, and "type" stores a character string "SYSTEM" or "USER" to distinguish a system or the user. The "mac" stores the mac of the user authentication service processing unit 31, in which for example, a hash value of a character string merging "userId" and "type" is calculated in accordance with a SHA-1 algorithm and the hash value is encrypted in accordance with a DES algorithm using a secret key of the user authentication service processing unit 31. An encrypted hash value is called Message Authentication Code. Other algorithms can be applied to the SHA-1 algorithm and the DES algorithm. By storing the message authentication code to "mac", it is possible to detect a falsification when "userId" and "type" are tampered with.

FIG. 5 is a diagram for illustrating an authentication determining process conducted by the user authentication service processing unit in step S12 in FIG. 2 in detail according to the embodiment of the present invention. In FIG. 5, when the user authentication service processing unit 31 receives the authentication ticket "authTicket" set as the argument by a call of checkTicket( ) method from the log management service processing unit 33 (L0101), the user authentication service processing unit 31 calculates a hash value merging "userId" and "type" of the authentication ticket "authTicket" received from the log management service processing unit 33, in accordance with the SHA-1 algorithm (L0102). The user authentication service processing unit 31 encrypts a calculated hash value in accordance with the DES algorithm using the secret key of the user authentication service processing unit 31 (L0103).

The user authentication service processing unit 31 compares an encrypted hash value with a mac indicated by the authentication ticket "authTicket" set as the argument (L0104). When the encrypted hash value does not match with the mac (L0105), the user authentication service processing unit 31 returns a determination result "valid" showing an error and terminates the authentication determining process (L0106 and L0107). On the other hand, when the encrypted hash value matches with the mac, the user authentication service processing unit 31 returns the determination result "valid" showing that the authentication ticket is valid (L0108), and terminates the authentication determining process (L0109).

FIG. 6 is a diagram for illustrating the initial process in application program in steps S13, S15, and S17 in FIG. 2 in detail, according to the embodiment of the present invention. In FIG. 6, a process in step S13 will be described in L0401 through L0405 in detail, a process in step S15 will be described in L0406 and L0407 in detail, and a process in step S17 will be described in L0408 through L0410 in detail.

The application program 20 calls authenticated method of the user authentication service processing unit 31 with a user ID and a password being possessed by the application program 20 itself as arguments (L0401).

The application program 20 determines whether or not an authentication failure is informed from the user authentication service processing unit 31 (L0402). When the authentication failure is informed, the process in step S13 returns an error and terminates the initial process in the application program 20 (L0403 and L0404).

On the other hand, when the authentication is successful, the application program 20 receives the authentication ticket "appTicket" as a result of an authenticated method (L0405). Then, the application program 20 calls startSession( ) method of the access control decision service processing unit 32 with the authentication ticket "appTicket" as an argument, and receives "appAccSession" showing a session ID (L0406). The application program 20 maintains the "appAccSession" in the application program 20 (L0407).

The application program 20 calls startSession( ) method of the log management service processing unit 33 with the authentication ticket "appTicket", and receives "appLogSession" showing an session ID (L0408). Then, the application program 20 maintains the appLogSession in the application program 20 (L0409), and terminates the initial process (L0410).

FIG. 7 is a diagram for illustrating a session start process conducted by the log management service processing unit or the access control decision service processing unit in steps S12, S16, and S18 in FIG. 2, according to the embodiment of the present invention. In FIG. 7, processes described as follows are conducted in each of steps S12, S16, and S118. In the following, the session start process in the log management service processing unit 33 in step S12 and step S18. Similarly, a session start process in the access control decision service processing unit 32 in step S16 is conducted.

The log management service processing unit 33 receives the authentication ticket when the startSession( ) method is executed (L0301).

The log management service processing unit 33 checks whether or not the type of the authentication ticket shows "SYSTEM" (L0302). When the type of the authentication ticket is not "SYSTEM" (L0303), the log management service processing unit 33 returns an error and terminates the session start process (L0304 and L0305). When the type of the authentication ticket is not "SYSTEM", that is, when the authentication ticket shows a regular user, since the regular user cannot record a log, the log management service processing unit 33 returns the error.

On the other hand, when the type of the authentication ticket is "SYSTEM", the log management service processing unit 33 calls checkTicket( ) method of the user authentication service processing unit 31 with the authentication ticket as an argument, in order to check whether or not the authentication ticket is valid (L0306).

When the authentication ticket is not valid (L0307), the log management service processing unit 33 returns an error and terminates the session start process (L0308 and L0309). The log management service processing unit 33 generates and records the session ID to a session management table (L0310). Then, the log management service processing unit 33 returns the session ID and terminates the session start process (L0311). The session management table is a table for managing the log record for each session. The session is identified by the session ID.

If any user can record a log to the log management service processing unit 33, a large amount of counterfeit logs may be recorded by the user. In this case, as a matter of face, it becomes impossible to audit the log later. However, as described above, in the embodiment, the log management service processing unit 33 has the user authentication service processing unit 31 authenticate a validity of a request originator before recording the log. Using this control to record the log, the log record can be prevented from an illegal user who attempts to record counterfeit logs.

The session start process describe above is conducted by the log management service processing unit 33 and the access control decision service processing unit 32, so that the log management service processing unit 33 and the access control decision service processing unit 32 can be used only by a request originator being valid. Accordingly, it is possible to reject an illegal log record request and an illegal access control decision request.

FIG. 8 is a diagram showing an example of an account management table used by the user authentication service processing unit according to the embodiment of the present invention. In FIG. 8, an account management table 6 includes items of "userId" showing a user ID identifying a user, "password" showing a password for authenticating the user, and "type" showing a type of the user. For example, a user identified by a user ID "appSystemA" is authenticated by a password "pwdAppSystem01", and has a type "SYSTEM". Similarly, a user identified by a user ID "userName01" is authenticated by a password "pwduserName01", and has a type "USER".

In the embodiment of the present invention, a method for registering an account to the account management table 6 is not specified. For example, management functions such as a registration, a deletion, and a like of an account with respect to the account management table 6 may be provided as methods of the Web services.

The account management table 6 shown in FIG. 8 illustrates an account management by the user ID and the password. Alternatively, the user authentication and the account management can be conducted by using a more rigorous method than a PKI (Public Key Infrastructure), a consultative authentication, and a like.

FIG. 9 is a diagram illustrating a user authentication process conducted by the user authentication service processing unit in steps S13 and S20 in FIG. 2 in detail according to the embodiment of the present invention. In FIG. 9, the user authentication service processing unit 31 conducts the user authentication process when the application program 20 calls and executes the authenticated method.

When the user authentication service processing unit 31 receives the user authentication request including the user ID and the password from the application program 20 (L0121), the user authentication service processing unit 31 searches for an entry corresponding to the user ID received from the application program 20, from the account management table 6 (L0122). When the entry is not found from the account management table 6, that is, when an identical user ID is not registered in the account management table 6, the user authentication service processing unit 31 calls a writeLog( ) method of the log management service processing unit 33 with the "sysLogSession" showing the session ID and log data showing the authentication failure (L0124), and terminates with an error (L0125 and L0126).

On the other hand, when the entry is found from the account management table 6, that is, when an identical user ID is registered in the account management table 6, the user authentication service processing unit 31 checks whether or not the password being received matches with a password of the entry (L0127). When the password being received does not match with the password of the entry (L0128), the user authentication service processing unit 31 calls the writeLog( ) method of the log management service processing unit 33 with the "sysLogSession" showing the session ID and the log data showing the authentication failure as arguments (L0129), and terminates with an error (L0130 and L0131).

On the other hand, when the password being received matches with the password of the entry, the user authentication service processing unit 31 creates the authentication ticket including entry information (the user ID and the type) so as to detect a falsification of the authentication ticket as described in FIG. 4 (L0132). Then, the user authentication service processing unit 31 calls the writeLog( ) method of the log management service processing unit 33 with the "sysLogSession" showing the session ID and the log data showing the successful authentication as arguments (L0133). The user authentication service processing unit 31 returns the authentication ticket ("appTicket" or "userTicket") as an authentication result capable of detecting a falsification and terminates the user authentication process (L0134).

FIG. 10 is a diagram for illustrating a log record process conducted in the log management service processing unit in steps S14, S21, and S24 in FIG. 2, according to the embodiment of the present invention. In FIG. 10, the log management service processing unit 33 conducts the log record processing by an execution of the writeLog( ) method by the user authentication service processing unit 31 or the application program 20. In FIG. 10, a request originator is the user authentication service processing unit 31 or the application program 20.

The log management service processing unit 33 receives the log record request including the session ID and the log data from the request originator (L0321), and checks whether or not the session ID is recorded in the session management table 6 (FIG. 8) (L0322). When the session ID is not recorded (L0323), the log management service processing unit 33 returns an error to the request originator and terminates the log record process (L0324 and L0235).

On the other hand, when the session ID is recorded, the log management service processing unit 33 records the log data in the log management service processing unit 33 (L0326), and terminates the log record process (L0327).

FIG. 11 is a diagram for illustrating a login process conducted by the application program in step S19 in FIG. 2, according to the embodiment of the present invention. In FIG. 11, the application program 20 conducts the login process by an execution of a login( ) method by the user 2.

The application program 20 receives the user ID and the password from the user 2 (L0421), calls the authenticated method of the user authentication service processing unit 31 with the user ID and the password received form the user 2 to authenticate the user 2 (L0422). When an authentication result received form the user authentication service processing unit 31 shows an authentication failure (L0423), the application program 20 informs the authentication failure to the user 2, and terminates the login process (L0424 and L0425).

On the other hand, when the authentication result shows a successful authentication, the application program 20 generates a session ID, and records the session ID to the session management table 6 (FIG. 8) in the application program 20 by associating with the authentication ticket returned by the authenticated method conducted by the user authentication service processing unit 31 (L0426). Then, the application program 20 returns the session ID and terminates the login process (L0427).

FIG. 12 is a diagram for illustrating an access process conducted by the application program in step S22 in FIG. 2, according to the embodiment of the present invention. In FIG. 12, the application program 20 receives the session ID, an object ID of an access object, and an access type from the user 2 (L0431).

Then, the application program 20 retrieves the authentication ticket associated with the session ID received form the user 2 from the session management table 6 (L0432). When there is no session ID matching with the session ID received form the user 2 (L0433), the application program 20 informs an error to the user 2, and terminates the access process (L0434 and L0435).

On the other hand, when there is a session ID matching with the session ID received form the user 2, in order to decide the access control, the application program 20 calls an is Allowed( ) method of the access control decision service processing unit 32 with "appAccSession" showing the session ID possessed in the application program 20, the user ID included in the authentication ticket, the object ID received from the user 2, the access type, and the like as arguments (L0436).

When an error is returned by an execution of the is Allowed( ) method by the access control decision service processing unit 32 (L0437), the application program 20 informs an error to the user 2, and terminates the access process (L0438 and L0429).

On the other hand, when "access is not allowed" is returned as a decision result from the access control decision service processing unit 21 by the execution of the is Allowed( ) method (L0440), the application program 20 informs the user 2 that the access is not allowed, and terminates the access process (L0441 and L0442).

On the other hand, when "access is allowed" is returned, the application program 20 processes the access required from the user 2 (L0443). The application program 20 calls the writeLog( ) method of the log management service processing unit 32 with the appLogSession showing the session ID possessed in the application program 20 and a log of the access process as arguments (L0444).

The application program 20 returns a process result of the access required from the user 2 (L0445), and terminates the access process (L0446).

A data structure of an access control table will be described with reference to FIG. 13 and FIG. 14.

FIG. 13 is a diagram showing a data structure of the access control table possessed in the access control decision service processing unit according to the embodiment of the present invention. FIG. 14 is a diagram showing a concept of the data structure of the access control table shown in FIG. 13 according to the embodiment of the present invention. In FIG. 14, portions corresponding to code in the data structure shown in FIG. 13 are shown by the same reference numerals.

Figure 14:
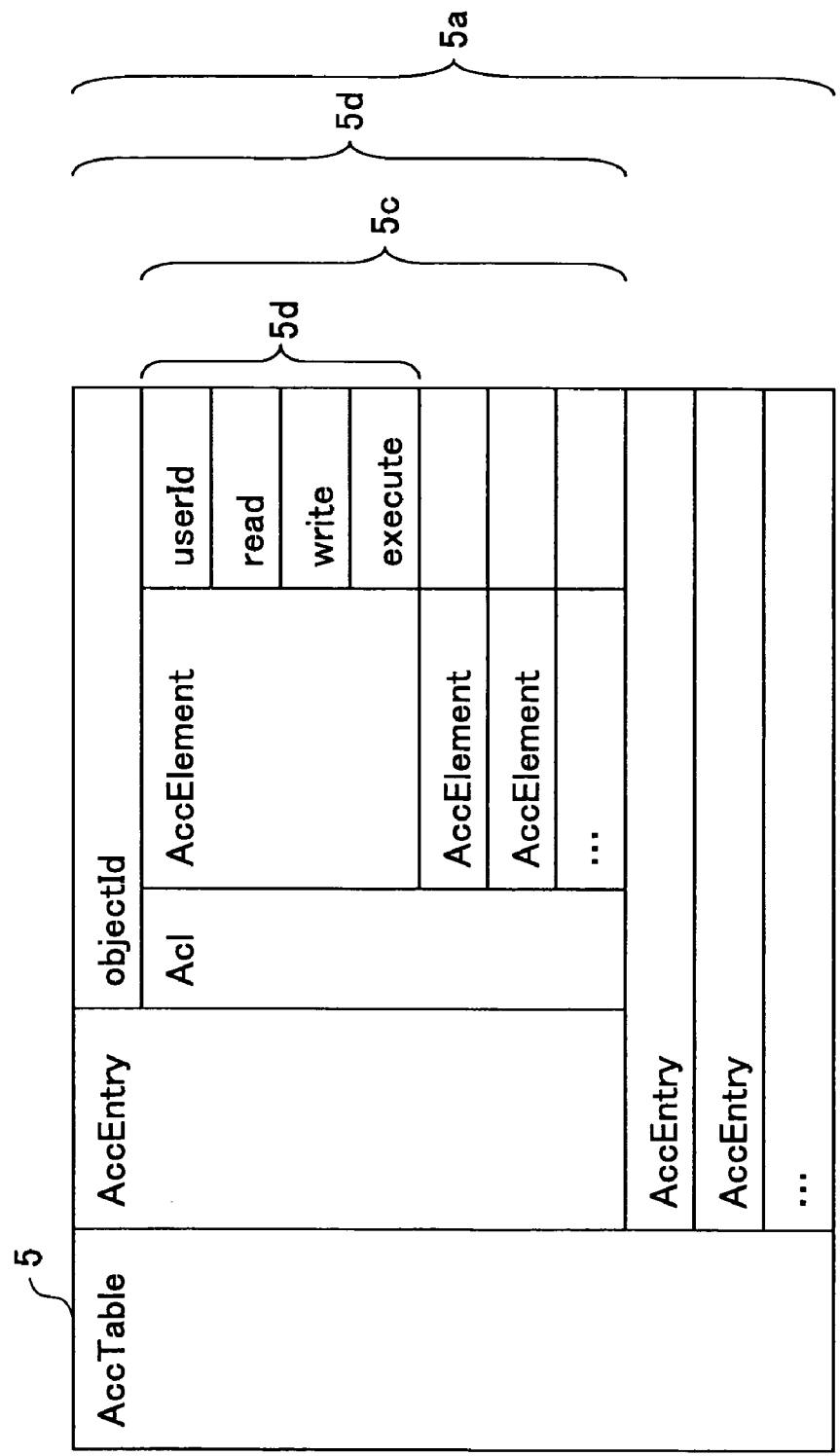
FIG. 14 is a diagram showing a concept of the data structure of the access control table shown in FIG. 13 according to the embodiment of the present invention.

Referring to FIG. 14, in FIG. 13, the data structure 5 of the access control table includes code 5a showing "AccTable{AccEntry[ ] accEntries;};", code 5b showing "AccEntry{String objectId; Acl acl;};", code 5c showing "Acl{AccElement[ ] accElements;};", and code 5d showing "AccElement {String userId; Boolean read; Boolean write; Boolean execute;};".

By the code 5a, "AccEntry" showing each entry to the access control table (AccTable) is managed by an array.

By the code 5b, "AccEntry" showing each entry includes "object Id" showing an object identifier for identifying an object, and "Acl" showing an access control list for the object.

Moreover, by the code 5c, the access control list "Acl" includes "AccElement" showing each access control element by an array. By code 5d, the access control element "AccElement" includes "userId" showing an user ID identifying the user 2, "read" showing by a true/false flag whether or not the user 2 is allowed to read, "write" showing by a true/false flag whether or not the user 2 is allowed to write, and "execute" showing by a true/false flag whether or not the user 2 is allowed to execute. Each of the true/false flags shows "1" when the user 2 identified by "userId" is allowed to access (read, write, or execute), and shows "0" when the user 2 identified by the "userId" is not allowed to access (read, write, or execute).

The access control table including the data structure 5 may be defined beforehand. Alternatively, for example, functions to change each of the true/false flags for the access control, add a new access control entry, and a like may be similarly provided as Web service methods.

FIG. 15 is a diagram for illustrating an access allowing process conducted by the access control decision service processing unit in step S23 in FIG. 2, according to the embodiment of the present invention. In FIG. 15, the access control decision service processing unit 32 receives the access control decision request including the session ID, the user ID, the object ID, and the access type (L0201).

The access control decision service processing unit 32 checks whether or not the session ID is recorded in a session management table (L0202). When the session ID is not recorded in the session management table (L0203), the access decision service processing unit 32 returns an error, and terminates the access allowing process (L0204 and L0205).

On the other hand, when the session ID is recorded in the session management table, the access control decision service processing unit 32 searches for an entry corresponding to the object ID in the access control table (L0206). When there is no entry corresponding to the object ID (L0207), the access control decision service processing unit 32 returns an error, and terminates the access allowing process (L0208 and L0209).

On the other hand, when there is the entry corresponding to the object ID, the access control decision service processing unit 32 checks by referring to entries in the access control table whether or not the access type is allowed for the user ID (L0210). When the access type is not allowed (L0211), the access control decision service processing unit 32 returns a decision result indicating that the access type is not allowed (L0212), and terminates the access allowing process (L0213 and L0214).

On the other hand, when the access type is allowed, the access control decision service processing unit 32 returns the decision result indicating that the user 2 is allowed for the access type (L0215), and terminates the access allowing process (L0216).

As described above, by realizing the user authentication service processing unit 31, the access control decision service processing unit 32, and the log management service processing unit 33 in the security server 30, it is possible to provide a function for securing information while the function is shared with the plurality of application programs 20.

In order to call a method through the SOAP, for example, the authenticated method and the checkTicket( ) method (called interfaces) of the user authentication service processing unit 31 may be written in a WSDL (Web Service Description Language), and a description file of the WSDL may be processed by using a technology being provided by IBM as a Web services toolkit. Then, a Java™ class library for calling method through SOAP and a template of the Java™ class library for a side being called through SOAP can be obtained. Accordingly, it is possible to implement a program providing each function of the services described above by using the template of the Java™ class library for the side being called through SOAP.

For example, Servlet™ can be realized by an executable Web server program, for example, as a Servlet™ conducting a call of the Java™ class library by handling SOAP towards Tomcat™ provided by Apache Software Foundation. In this case, for example, Axis™ provided by Apache Software Foundation may be activated and an implemented program may be used from Axis™. Accordingly, it is possible to call a method in the security server 30 through SOAP.

In the embodiment of the present invention, when the application program 20 calls the method of each of the user authentication service processing unit 31, the access control decision service processing unit 32, and the log management service processing unit 33, the application program 20 may call the method by using the Java™ class library for the side being called through SOAP. Then, the Java™ class library converts a call of the method into a SOAP request and the SOAP request is sent to a network. Each service receives a SOAP response and sends a returned value of the method to the application program 20.

FIG. 16 is a diagram showing a functional configuration to provide a Web service through SOAP, according to the embodiment of the present invention. In FIG. 16, the security server 30 conducting a communication control in accordance with SOAP includes the user authentication service processing unit 31, the access control decision service processing unit 32, the log management service processing unit 33, a user account management table 41, an access control table 42, a log database 43, and a SOAP handler 50.

The SOAP handler 50 analyzes SOAP data when receiving the SOAP data, and calls Web services provided by the user authentication service processing unit 31, the access control decision service processing unit 32, the log management service processing unit 33, respectively. The SOAP handler 50 sends the Web service as the SOAP data.

For example, when the SOAP handler 50 analyzes SOAP data when receiving the SOAP data and determines that the SOAP data requires the user authentication, the SOAP handler 50 calls the user authentication service processing unit 31 by calling "ticket=authenticate(username, password)" (function call), creates SOAP data showing a process result "ticket" as a result of the user authentication service processing unit 31, and provides a request originator as the Web service.

Moreover, when the SOAP handler 50 analyzes SOAP data when receiving the SOAP data and determines that the SOAP data requires the access control decision, the SOAP handler 50 calls the access control decision service processing unit 32 by calling "decisionInfo=is Allowed(ticket, userInfo, docInfo, accessType)" (function call), creates SOAP data showing a process result "decisionInfo" as a result of the access control decision service processing unit 32, and provides a request originator as the Web service.

Furthermore, when the SOAP handler 50 analyzes SOAP data when receiving the SOAP data and determines that the SOAP data requires the log record, calls the log management service processing unit 33 by calling "result=writeLog(ticket, logText)" (function call), creates a process result "decisionInfo" as a result of the log management service processing unit 33, and provides a request originator as the Web service.

As described above, it is possible to provide the functions such as the user authentication, the access control, the log record, and the like as the Web services. Thus, various application programs 20 can secure information by using those Web services. Since the user authentication, the access control, the log record, and the like are provided as the Web services, those Web services are not limited to an operating system (OS), a language, and a like at a side of each of the application programs 20.

By providing as the Web services, anyone can use functions of the web services. For example, by preventing systems (users) other than a valid system being registered beforehand to make the log record, it is possible to eliminate a problem that makes it difficult to secure information when an invalid user records a large amount of logs.

In this case, the functional configuration implementing SOAP is illustrated. However, other remote operation protocol, for example, RPC (Remote Procedure Call), Java™, RMI (Remote Method invocation), IIOP (Internet Inter-ORB Protocol), DCOM (Distributed Component Object Model), and a like can be applied.

Accordingly to the present invention, it is possible to provide security functions needed to the plurality of the application programs 20 as the Web services with consistency while the Web services are shared with the application programs 20. By using the Web services realized in the present invention, it is possible for each of the plurality of the application programs 20 to conduct a standard security. In addition, since the plurality of the application programs 20 can use the Web services in common, the consistent security can be realized among the plurality of the application programs 20.

The present invention is not limited to the specifically disclosed embodiments, and variations and modifications may be made without departing from the scope of the present invention.

The present application is based on the Japanese Priority Application No. 2003-385463 filed on Nov. 14, 2003, the entire contents of which are hereby incorporated by reference.

What is claimed is:

1. A method comprising:
receiving, at a security server, an access control decision request as a request of a remote operation call from an external application through a network;
determining, at the security server, whether or not the external application of the access control decision request is a valid system, by obtaining from the access control decision request a session identification (ID) indicating that the external application has been authenticated as the valid system allowed by the security server to record a log in the security server and checking whether the session ID is registered in a session management table within the security server;
deciding based on the access control decision request to allow, or not to allow, access after the external application is determined to be the valid system; and
returning a decision result to allow, or not to allow, access as a response of the remote operation call to the external application through the network,
wherein information is secured for the external application through the network.

2. An article of manufacture having one or more recordable media storing instructions thereon which, when executed by a security server, cause the security server to perform a method comprising:
receiving an access control decision request as a request of a remote operation call from an external application through a network;
determining whether or not the external application of the access control decision request is a valid system, by obtaining from the access control decision request a session identification (ID) indicating that the external application has been authenticated as a valid system allowed by the security server to record a log in the security server and checking whether the session ID is registered in a session management table within the security server;
deciding based on the access control decision request whether or not to access the external application after it is determined that the external application is the valid system;
returning a decision result to allow, or not to allow, access as a response of the remote operation call through the network; and
recording contents of the access control decision request, the decision result, and a log,
wherein information is secured for the external application through the network.

3. The article as claimed in claim 2, said method further comprising:
receiving a log record request as a request of the remote operation call from the external application which is authenticated as the valid system allowed to record the log through a network;
recording the access control decision request and the decision result for the user as a log in response to the log record request; and
returning a result from recording the log as a response of the remote operation call to the external application through the network.

4. The article as claimed in claim 3, said method further comprising:

determining whether or not the external application sending the log record request is the valid system, by obtaining, from the log record request, a second session identification (ID) indicating that the external application has been authenticated as the valid system allowed to record the log and checking whether the second session ID is registered in a second session management table within the security server, when receiving the log record request;

wherein in said recording the log, the access control decision request and the decision result for the user are recorded as the log in response to the log record request, when it is determined that the external application sending the log record request is the valid system.

5. The article claimed in claim 3, wherein the remote operation call through the network can be executable in accordance with at least one of protocols including Remote Procedure Call, Java™, Remote Method Invocation, Internet Inter-ORB Protocol, and Distributed Component Object Model, and Simple Object Access Protocol.

6. An apparatus capable of executing computer-executable application program as a computer connectable to a network, wherein executing the application program causes the apparatus to perform a method comprising:

receiving authentication data including user identification information identifying a user and a user password from the user to authentication the user;

conducting a first remote operation call to a security server to make a user authentication request using the authentication data received from the user through the network, the security server ensuring security of an application;

obtaining an authentication result by receiving a response of the first remote operation call from the security server;

receiving an access request for accessing an information resource being managed by the application program from the user;

conducting a second remote operation call to the security server to make an access control decision request for deciding whether or not the access request is allowed, by using a session identification (ID) identifying the application which has been authenticated as a valid system by the security server allowed to record a log in the security server, the session ID obtained from the security server to request an access determination;

obtaining an access control decision result by receiving a response of the second remote operation call from the security server;

controlling an access to the information resource based on the access control decision result; and conducting a third remote operation call to the security server to make a request for recording a log concerning the access through the network, by using a second session ID identifying the application which has been authenticated as the valid system allowed by the security server to record the log in the security server, the second session ID obtained from the security server to request a log record.

7. The apparatus capable of implementing an application program being computer-executable as a computer connectable to a network as claimed in claim 6, wherein the first remote operation call, the second remote operation call, and the third remote operation call through the network can be executable in accordance with at least one of protocols including Remote Procedure Call, Java™, Remote Method Invocation, Internet Inter-ORB Protocol, and Distributed Component Object Model, and Simple Object Access Protocol.

8. A security server to connect to an external application and ensure the external application which provides a service to a client terminal, said security server comprising:

a first authentication processing unit configured to authenticate the external application by whether or not a user ID and a password of the external application, and a type indicating that the external application is a valid system allowed by the security server to record a log in the security server, are registered in a session management table in the security server;

an authentication request acceptance processing unit configured to accept an access control decision request, which indicates an authentication request for the client, from the external application, after the external application is authenticated as the valid system allowed by the security server to record a log in the security server by the first authentication processing unit;

a second authentication processing unit configured to determine whether an access from the client to the external application is allowed or not allowed, with respect to the access control determination request accepted by the authentication request acceptance processing unit; and a notification processing unit configured to notify the external application when the access from the client to the external application is allowed by the second authentication processing unit.

9. The method as claimed in claim 1, wherein the session ID registered in the session management table is an ID which is registered when the external application is determined by the security server as the valid system based on an authentication ticket which is obtained by the external application from the security server by using authentication information of the external application.

* * * * *